(12) United States Patent
Vasamsetti et al.

(10) Patent No.: US 6,584,074 B1
(45) Date of Patent: Jun. 24, 2003

(54) SYSTEM AND METHOD FOR REMOTE CONFIGURATION AND MANAGEMENT OF CUSTOMER PREMISE EQUIPMENT OVER ATM

(75) Inventors: Satyan Vasamsetti, Danville, CA (US); Johan M. Casier, San Jose, CA (US); Mike Miscevic, Santa Clara, CA (US)

(73) Assignee: Covad Communitions Group, Inc., Santa Clara, CA (US)

( * ) Notice: Subject to any disclaimer, the term of this patent is extended or adjusted under 35 U.S.C. 154(b) by 0 days.

(21) Appl. No.: 09/372,650

(22) Filed: Aug. 11, 1999

(51) Int. Cl.[7] .................................................. H04J 3/12
(52) U.S. Cl. .................................. 370/254; 370/395.52
(58) Field of Search .............................. 370/254, 395.5, 370/395.52, 255, 395.2; 709/227

(56) References Cited

U.S. PATENT DOCUMENTS

| 5,600,643 A | * | 2/1997 | Robrock, II | 370/399 |
| 5,909,430 A | * | 6/1999 | Reaves | 370/254 |
| 6,097,720 A | * | 8/2000 | Araujo et al. | 370/355 |
| 6,292,485 B1 | * | 9/2001 | Trotta et al. | 370/389 |
| 6,314,088 B1 | * | 11/2001 | Yamano | 370/254 |
| 6,396,813 B1 | * | 5/2002 | Glass, III et al. | 370/252 |
| 6,418,126 B1 | * | 7/2002 | Gilmurray et al. | 370/310.1 |
| 6,452,923 B1 | * | 9/2002 | Gersberg et al. | 370/352 |

* cited by examiner

Primary Examiner—Min Jung
(74) Attorney, Agent, or Firm—Jung-hua Kuo

(57) ABSTRACT

Systems and methods for providing remote configuration and on-demand management of a CPE over DSL are disclosed. The method generally comprises creating a temporary management ATM virtual circuit between a remote Point-to-Point Protocol ("PPP") server and the CPE via an ATM network, assigning a temporary Internet Protocol ("IP") address to the CPE using PPP over ATM, telneting from the PPP server to the temporary IP address of the CPE, and downloading CPE configuration from the PPP server to the CPE. The creating, assigning, telneting, and downloading may be performed between the remote PPP server and a management port of the CPE. The system generally comprises a remote PPP server, a CPE including a management port adapted to send requests for connection to the PPP server and to receive data downloaded from the PPP server, and a temporary management ATM virtual circuit between the PPP server and the management port of the CPE.

22 Claims, 5 Drawing Sheets

SYSTEM AND METHOD FOR REMOTE CONFIGURATION AND MANAGEMENT OF CUSTOMER PREMISE EQUIPMENT OVER ATM

BACKGROUND OF THE INVENTION

1. Field of the Invention

The present invention relates generally to digital communications. More specifically, systems and methods for providing remote configuration of client premise equipment over ATM for use in technologies such as a digital subscriber line are disclosed.

2. Description of Related Art

With growth of the Internet and increased desirability of telecommuting, there is an increasing demand for reliable, on-demand high-speed data access. One emerging technology is a connection-oriented packet network for providing a connection between a remote user and a destination. The connection-oriented packet network uses a Digital Subscriber Line ("DSL") link to access the remote user premises.

Generally, a DSL link links a remote user, such as a client, to a customer, such as a corporation and Internet Service Providers ("ISPs"). The client may be an employee of a customer corporation with the client premise being the home of the employee such that the employee is able to telecommute. The client may also be a small business having access to the Internet via a customer ISP. A client premise may be any other location that uses ordinary telephone system twisted copper pair wiring connections between the remote user and a telephone company central office ("CO") to achieve data connection.

The telephone line from the CO to the remote user location is often referred to as "the last mile." DSL technology utilizes a line-coding scheme that allows very high-speed and affordable data access connections over this last mile of twisted copper wiring.

Various DSL technologies, referred to as xDSL technologies, have been implemented. Examples of DSL technologies include asymmetric DSL ("ADSL"), symmetric DSL ("SDSL"), ISDN DSL ("IDSL"), rate adaptive DSL ("RADSL"), and very high-speed DSL ("VDSL") technologies, for example.

Competitive local exchange carriers ("CLEC") may provide DSL service over twisted telephone copper pairs leased from an incumbent local exchange carrier (ILEC), i.e. the local phone company in an area. The copper telephone pairs run from the ILEC's CO to the client's premise, e.g. a home or a business. At the client's premises, a network interface device ("NID") connects the copper pairs to the inside wiring. The NID is typically on a side of a building of the client premise, in a garage, or in a service closet.

In addition, a DSL client premise equipment ("CPE") provides connection between the NID and a client's computer. The CPE generally refers routers and bridges for connecting users to the DSL link. An example of a CPE is a Flowpoint™ 144 provided by FlowPoint Corporation (Los Gatos, Calif.

Signals are delivered between the client's computer and the CPE at the client premise and the CO via the DSL line over the telephone twisted copper pair wiring. CPEs are typically connected via the DSL line over asynchronous transfer mode ("ATM") virtual circuits ("VCs"). Examples of virtual circuits include a permanent virtual circuit ("PVC"), a soft or smart PVC ("SPVC"), and a switched virtual circuit ("SVC").

A number of CO's in a region may be connected to a CLEC regional switching center. The CLEC regional switching center is in turn connected to the corporate networks of the customers and/or the ISPs which are in turn connection to the Internet. The CLEC regional switching center is also connected to a CLEC network operations center ("NOC") where the CLEC controls and manages the operations and connections of the CLEC regional switching center.

Establishing DSL services to a client premise typically involves both ILEC installation and CLEC installation. In particular, the ILEC installs the copper pair from the ILEC CO to the NID at the customer premise. The CLEC provides the customer with information the customer needs to configure a router or switch at the customer premise to handle the new client connection, such as a permanent virtual circuit ("PVC"), a virtual path/channel identifier ("VPI/VCI") for ATM, or a data link connection identifier ("DLCI") for frame relay. The customer may then configure the router prior to the CLEC installation such that an end-to-end network connectivity test may be performed during the CLEC installation at the client premise.

For the CLEC installation, a CLEC field service technician generally must physically go to the remote client's premise. The CLEC installation sets up the inside, wiring from the NID to the computer at the client premise and sets up the DSL service from the client to the customer such as the customer ISP or the customer corporation. In particular, the CLEC field service technician using, for example, the field service technician's laptop computer, may complete and/or verify inside wiring at the client's premise, configure and install a DSL CPE, perform CLEC connectivity test, and/or perform an end-to-end customer network connectivity test. In addition, the CLEC field service technician may, if requested, notify the customer before beginning test and deliver customer-provided DSL information packet. The CLEC may then notify the customer of the completion of the installation.

As is evident, requiring a CLEC field service technician to physically go to the client premise is time consuming and not cost effective both for the CLEC and the client. Such a visit generally requires the client to be at the client premise during an appointed time frame in order to allow the CLEC field service technician access to the client premise. In addition, there may be periodic management activities, such as upgrades of and/or changes to software for the CPE and/or changes in the customer ISP or the customer corporation, that would also require the CLEC field service technician to again go to the client premise.

Therefore, it would be desirable to provide a system and method for remote configuration and on-demand management of the CPE, such as over the DSL link using layer 2 ATM technology. Such a system and method would increase cost and time efficiency of establishing, managing, and maintaining the DSL link between a client and a customer.

SUMMARY OF THE INVENTION

Systems and methods for providing remote configuration and on-demand management of a CPE over DSL are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for providing remote configuration of a CPE, generally comprises creating a temporary management ATM virtual circuit between a remote Point-to-Point Protocol ("PPP") server and the CPE via an ATM network, assigning a temporary Internet Protocol ("IP") address to the CPE using PPP over ATM, telneting from the PPP server to the temporary IP address of the CPE, and downloading CPE configuration from the PPP server to the CPE. The creating, assigning, telneting, and downloading may be performed between the remote PPP server and a management port of the CPE.

The method may also include sending a reboot signal from the PPP server to the CPE after the downloading, disenabling the temporary management ATM virtual circuit after the downloading and/or verifying connectivity after the downloading by pinging to the CPE and awaiting a response. The downloading may include downloading initial CPE configuration software, which may include a permanent assigned CPE IP address. The downloaded CPE configuration may be upgrade CPE configuration software, troubleshooting CPE software, CPE configuration feature activation software, CPE configuration feature deactivation software, and/or CPE target change software. The temporary management ATM virtual circuit may be a permanent virtual circuit or a switch virtual circuit.

The system for providing remote configuration of a CPE generally comprises a remote PPP server, a CPE including a management port adapted to send requests for connection to the PPP server and to receive data downloaded from the PPP server, and a temporary management ATM virtual circuit between the PPP server and the management port of the CPE.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Systems and methods for providing remote configuration and on-demand management of a CPE over DSL are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention may have not been described or shown in detail so as not to unnecessarily obscure the present invention.

Figure 1:
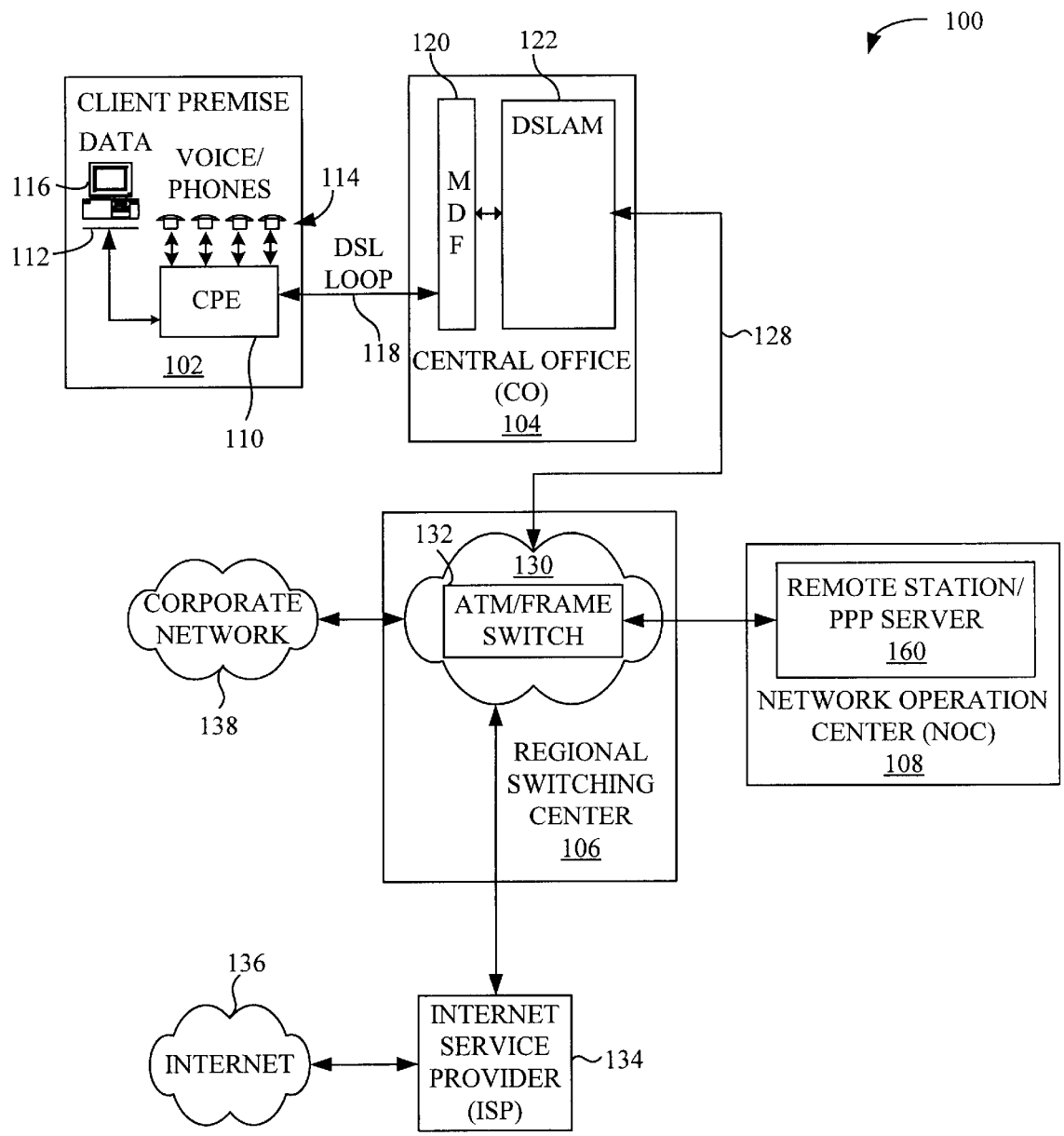
FIG. 1 is a block diagram illustrating a DSL network between a client and a customer.

An overview and background of typical architecture of a DSL network will be presented with reference to FIG. 1, which will serve as a basis for subsequent discussions of the systems and methods for providing remote configuration and management of a CPE over DSL. FIG. 1 is a block diagram illustrating a typical architecture of a DSL network 100 between a client and a customer.

The DSL network 100 generally comprises connections among equipment at a client premise 102, a switching station or a central office ("CO") 104, a regional switching center 106, and a network operation center ("NOC") 108. A CPE 110 is provided at the client premise 102. The CPE 110 preferably provides one or more data ports to which one or more computers 116 are connected. The one or more computers 116 may be connected to the CPE 110 via one or more Ethernets or a local area networks ("LANs") 112. If the CPE is a derived voice CPE ("DV-CPE"), one or more telephones, facsimile machines, or modems 114 may be connected to one or more voice ports of the DV-CPE 110.

The CPE 110 at the client premise 102 is connected to a DSL link or loop 118 over a twisted pair of copper phone lines which are in turn connected to a main distribution frame ("MDF") 120 in the central office 104. The MDF 120 simply serves to aggregate various twisted pairs of copper phone lines from various client premises within a geographical region.

The twisted pairs of copper phone lines running DSL loops are connected to a DSL access multiplexer ("DSLAM") 122 via the MDF 120. The DSLAM 122 is equipment deployed in the COs to terminate the client DSL loops. The DSLAM 122 may include a plurality of ATM interconnect ports for implementing ATM methodologies to which each DSL loop 118 is connected. The DSLAM 122 may provide ports for various DSL technologies, such as ADSL, SDSL, IDSL, RADSL or VDSL ports. The DSL loop 118 may be connected to a suitable one of the DSL technology ports of the DSLAM 122. The DSLAM 112 multiplexes the customer loops onto a backhaul or trunk circuit for transport back to an ATM or Frame Relay switch. Thus, signals transmitted via the DSL loop 118 to and from the client premise 102 are multiplexed through DSLAM 122.

Although not shown, a plurality of COs within a geographical region are typically connected to a single regional switching center. A local network of COs and regional switching center includes interconnections between the regional switching center and each of the plurality of COs. Each CO is in turn connected to a plurality of client premises.

Traffic from a number of central offices may be aggregated on a regional network 130 in a regional switching center 106. The regional network 130 may include a plurality of ATM/Frame switches 132. The DSLAM 122 of the central office 104 connects to one of the ATM/Frame switches 132 in the regional network 130 via a Time Division Multiplexed ("TDM") link 128, such as a DS-3 or STS-3c. In other words, the DSLAM 122 multiplexes multiple DSL lines onto a high-capacity transmission line for providing an ATM protocol connection between the DSL lines and the ATM/Frame network switch 132.

Typically, an incumbent local exchange carrier ("ILEC") owns and operates the COs and the lines between the COs and the client premises. Competitive local exchange carriers ("CLECs") typically do not own any traditional voice equipment in the telephone company COs nor the lines between the COs and the client premises but generally lease lines between the COs and the client premises.

The local network may be provided within the geographical region to enable a CLEC to have immediate broad coverage within the community. In particular, for each geographical region in which the CLEC wishes to provide service, the CLEC may locate a CLEC regional switching center at a central location within the geographical region and run or lease fiber facilities from the CLEC regional switching center to each of the ILEC COs within the community. Further, the CLEC need only provide one voice gateway and one Class-5 switch for each CLEC regional switching center rather than for each CO, as the ILEC currently provides. Because an ATM network is a distributed network, only one CLEC regional switching center needs to be provided by a particular CLEC for hundreds of COs. For example, in the San Francisco Bay Area, only one or two regional switching centers for each CLEC need to be provided to interconnect all the COs in the entire geographical region.

The ATM/Frame switch 132 in the regional network 130 is connected to one or more customers, such as an internet service provider ("ISP") 134 and/or a corporate network 138. Each ISP 134 is connected to the Internet 134.

The ATM/Frame switch 132 in the regional network 130 is also connected to the CLEC network operations center ("NOC") 108 where the CLEC controls and manages the operations and connections of the CLEC regional switching center 106.

Although the CLEC is described as providing DSL services to clients and customers for purposes of discussion, it is to be understood that the ILEC can also provide DSL services to clients and customers.

As described above, establishing DSL services to the client premise via the CPE typically involves both ILEC installation and CLEC installation. In particular, the ILEC installs the copper pair from the ILEC CO to the NID at the customer premise.

On the customer side, the CLEC provides the customer with information regarding the configuration of the customer's router or switch at the customer premise such that the customer's router or switch can handle the new connection to the remote client premise. The customer may then configure the router prior to the CLEC installation such that an end-to-end network connectivity test may be performed during the CLEC installation at the client premise.

Figure 2:
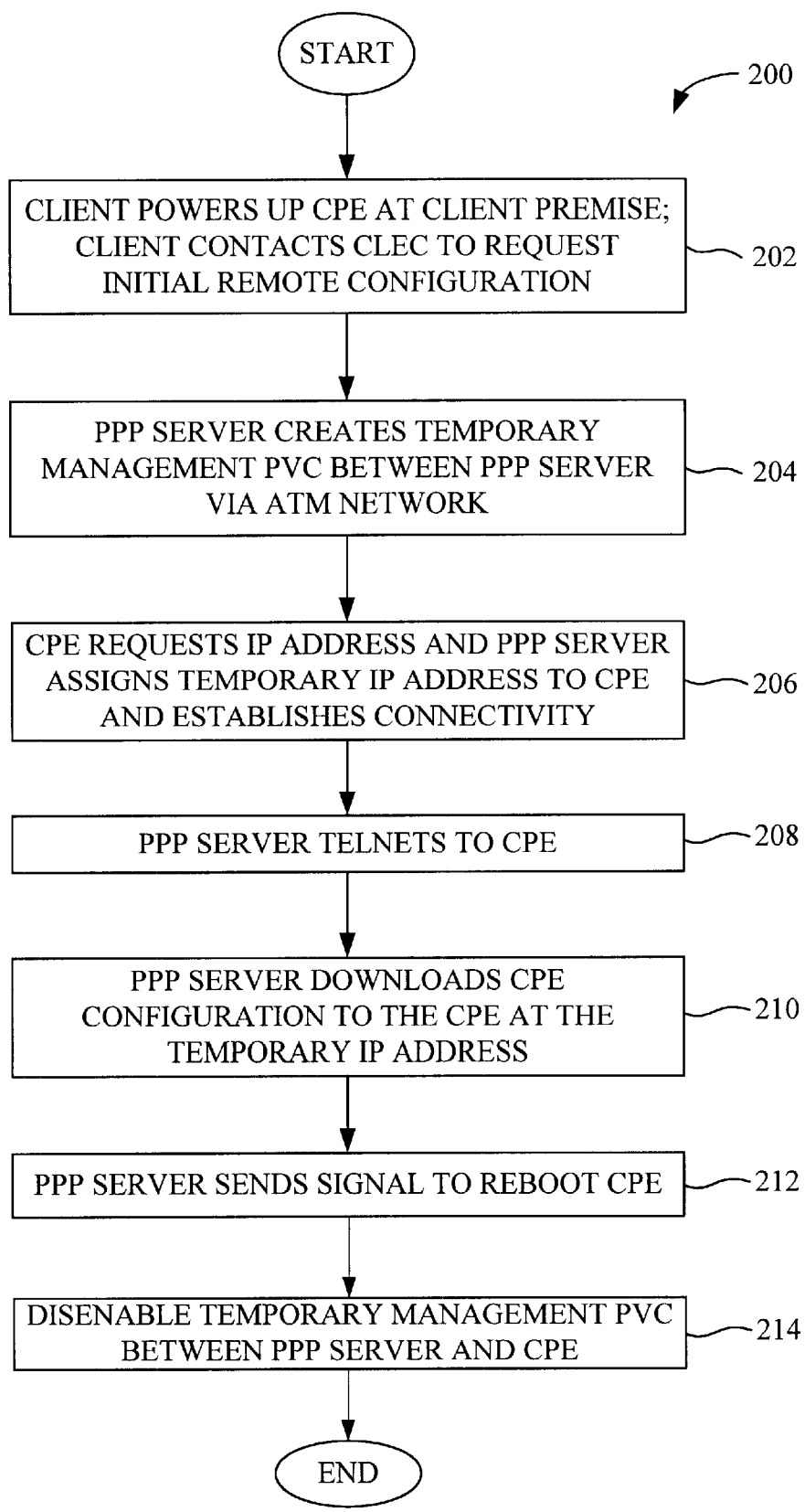
FIG. 2 is a flow chart illustrating a process for remotely configuring a CPE at a client premise from a CLEC NOC.

FIG. 2 is a flow chart illustrating a process 200 for remote CLEC installation. As described above, conventionally, the CLEC installation requires a CLEC field service technician to go to the client's premise. The CLEC field service technician sets up the inside wiring from the NID to the computer at the client premises and sets up the DSL service from the client to the customer. In particular, the CLEC field service technician may complete and/or verify inside wiring at the remote client premise to the customer, configure and install a DSL CPE, perform CLEC connectivity test, and/or perform an end-to-end customer network connectivity test.

In addition, the CLEC field service technician may, if requested, notify the customer before beginning test and deliver customer-provided DSL information packet. The CLEC may then notify the customer of the completion of the installation at the client premises.

In the remote CLEC installation process 200, the client powers up the CPE at the client premise at step 202. The client then contacts the CLEC to request initial remote configuration of the CPE also at step 202. The default factory configuration for the CPE is Point-to-Point Protocol ("PPP") over ATM mode.

At step 204, a PPP server at the NOC creates a temporary management PVC between the PPP server and the CPE via the ATM network at the regional switching center. The CPE then requests an Internet Protocol ("IP") address from the PPP server at step 206. In response, the PPP server assigns a temporary IP address to the CPE and establishes connectivity between the PPP server at the NOC and the CPE at the remote client premise also at step 206. Although the connection between the PPP server and the CPE via the ATM network is described in terms of a temporary management PVC, another temporary management ATM virtual circuit, such as a temporary management switch virtual circuit, may be established.

By creating the temporary management PVC and assigning a temporary IP address to the CPE, a layer 3 or IP connectivity is established between the CPE at the remote client premise and the PPP server at the NOC. In other words, a static route is created between the CPE and the PPP server over the management PVC. The layer 3 connectivity can then be used to remotely configure and manage the CPE. Also, the assignment of the temporary IP address can be obtained using dynamic host configuration protocol ("DHCP").

At step 208, the PPP server at the NOC telnets to the CPE at the remote client premise using the temporary IP address. At step 210, the PPP server at the NOC downloads CPE configuration to the CPE at the remote client premise via the established telnet to the temporary IP address. As is known in the art, the downloaded CPE configuration includes a permanent CPE IP address to enable it to connect to a customer ISP or corporate network.

At step 212, the PPP server at the NOC sends a signal to the CPE at the client premise via the established telnet to the temporary IP address to reboot the CPE at the client premise. Finally, at step 214, the temporary management PVC between the PPP server at the NOC and the CPE at the client premise is taken down or disenabled.

At this point, the CPE at the client premise should be configured and ready for use in the DSL connection between the client premise and the target customer site.

The remote configuration process 200 preferably also includes a remote connectivity testing process to confirm connectivity between the CPE at the remote client premise and the PPP server at the NOC, as will be described below with reference to FIG. 3.

Figure 3:
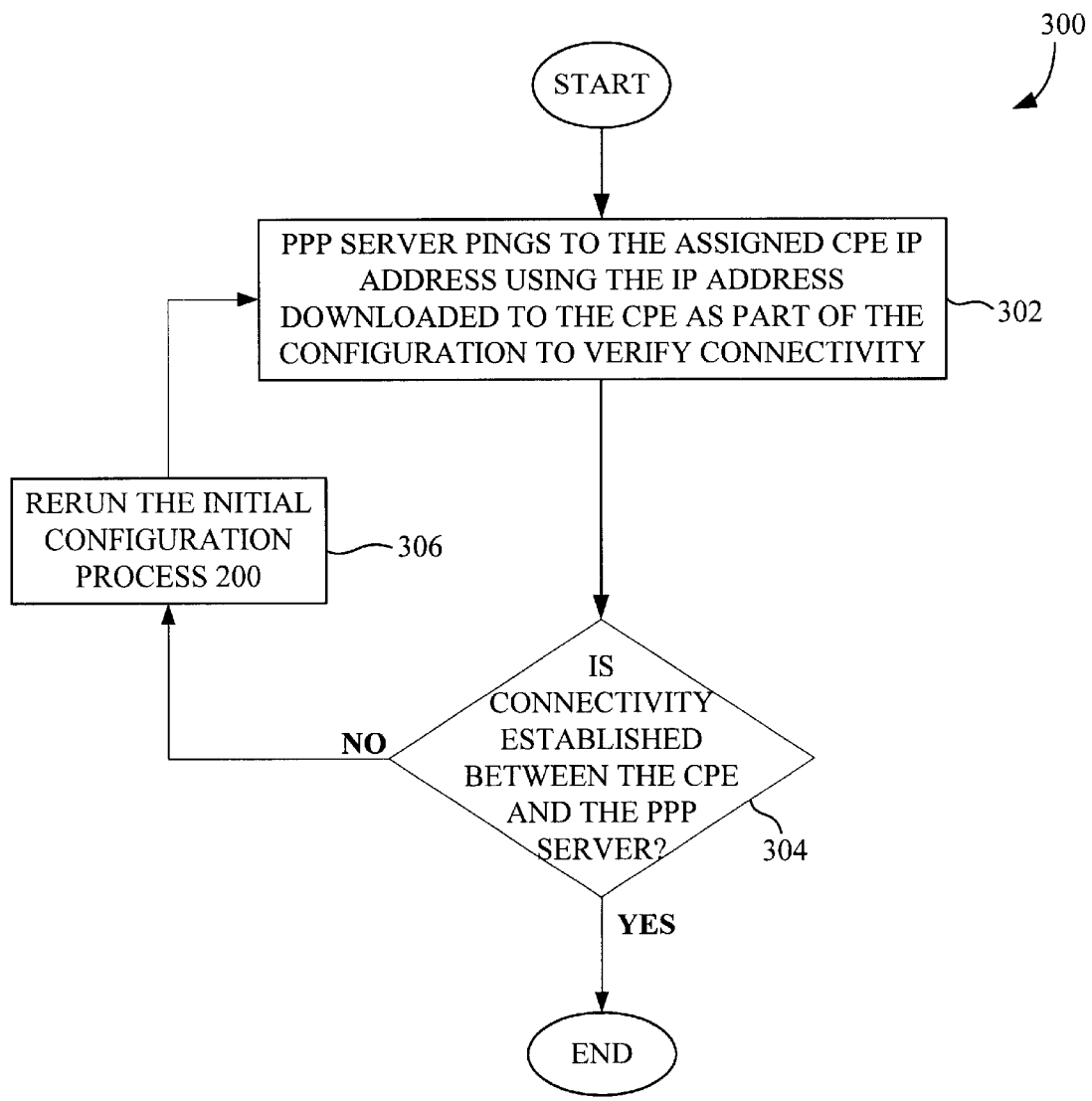
FIG. 3 is a flow chart illustrating a process for remotely testing connectivity between the CPE at the client premise and the CLEC NOC.

FIG. 3 is a flow chart illustrating a process 300 for remotely testing connectivity between the CPE at the client premise and the CLEC NOC. At step 302, the PPP server pings to the CPE IP address to verify connectivity. As noted above, the CPE IP address is assigned to the CPE and downloaded to the CPE as part of its configuration. Ping refers to "packet internet groper" which is a software utility used in data communications, often used as a diagnostic tool. The ping software utility employs an echo to detect the presence of another system, e.g., the CPE at the remote client premise, and any delay which might be occurring in the connection.

At step 304, the PPP server awaits for a response from the CPE at the remote client premise to the ping sent at step 302. If no response is received by the PPP server from the CPE at the remote client premise after a predetermined period of time, the initial remote configuration process 200 is rerun at step 306. Otherwise, if a proper response is received by the PPP server from the CPE at the remote client premise after a predetermined period of time, the process 300 is complete as the process 300 has confirmed that connectivity is established between the CPE at the client premise and the CLEC NOC.

Figure 4:
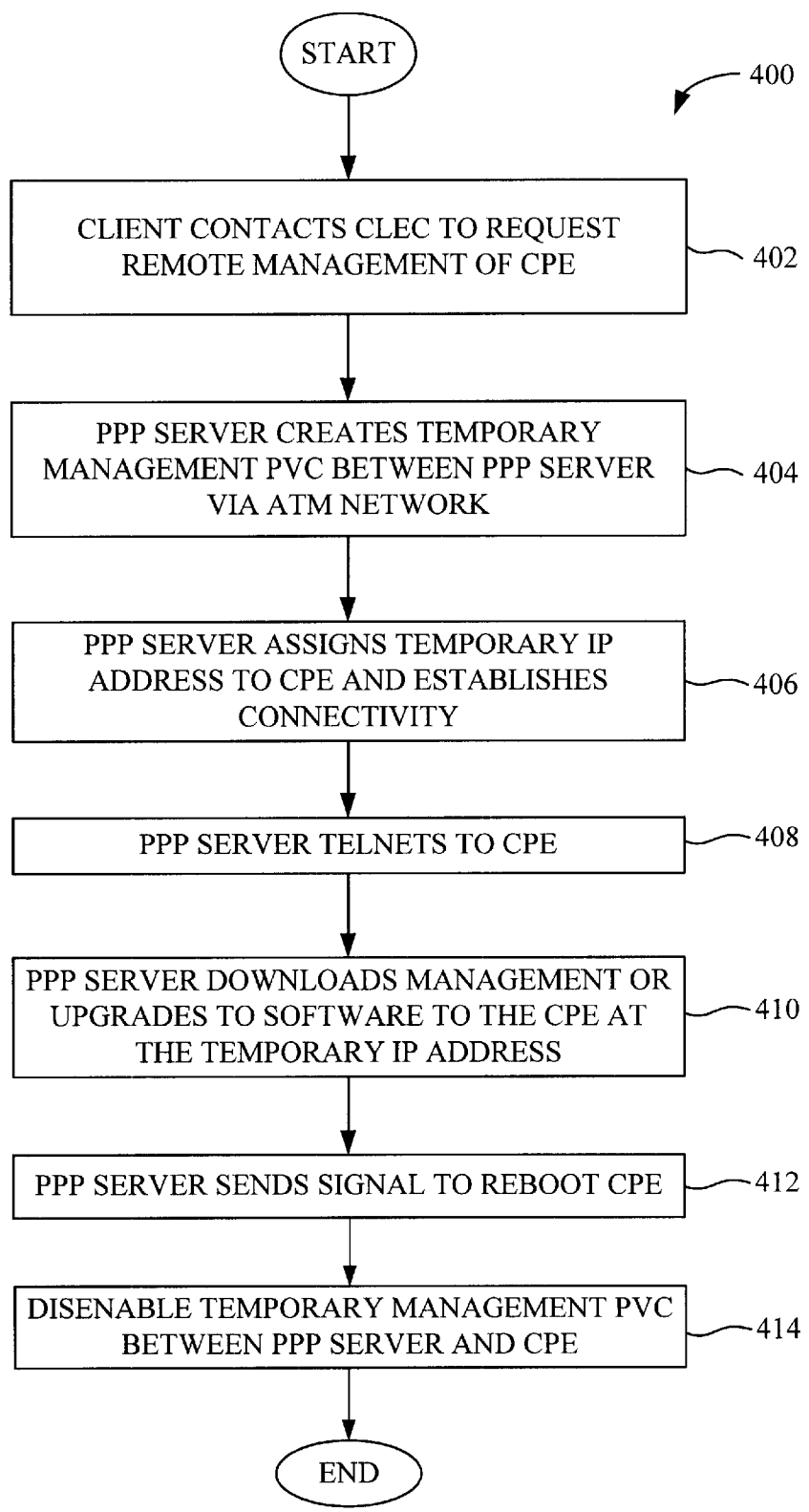
FIG. 4 is a flow chart illustrating a process for remotely managing a CPE at a client premise from the CLEC NOC.

FIG. 4 is a flow chart illustrating a process 400 for remotely managing a CPE at a client premise from the CLEC NOC. As noted above, there may be periodic management activities with respect to the CPE at the remote client premise. Periodic management activities may include troubleshooting management, activation or deactivation of certain features, software upgrades and/or changes, and changes in the customer ISP or the customer corporation, i.e. changes in the remote target of the client or CPE. Such periodic management activities would conventionally require the CLEC field service technician to again go to the client premise to install such changes into the CPE. However, process 400 allows on-demand remote management of the CPE at the client premise.

Remote CPE management process 400 is similar to the remote initial CPE configuration process 200. With the CPE powered up, the client contacts the CLEC to request or confirm remote management of the CPE at step 402. This step is optional. Preferably, the CLEC informs the client when the upgrade and/or management of the CPE is to be done as the CPE is not available to enable DSL access during the upgrade and/or management.

At step 404, the PPP server at the NOC creates a temporary management PVC between the PPP server and the CPE via the ATM network at the regional switching center. At step 406, the PPP server assigns a temporary Internet Protocol ("IP") address to the CPE and establishes connectivity between the PPP server at the NOC and the CPE at the remote client premise.

At step 408, the PPP server at the NOC telnets to the CPE at the remote client premise using the temporary IP address. At step 410, the PPP server at the NOC downloads changes or new configuration to the CPE at the remote client premise via the established telnet to the temporary IP address. Such changes may include software changes and/or upgrades and changes in the customer ISP or the customer corporation, for example.

At step 412, the PPP server at the NOC sends a signal to the CPE at the client premise via the established telnet to the temporary IP address to reboot the CPE at the client premise. Finally, at step 414, the temporary management PVC between the PPP server at the NOC and the CPE at the client premise is taken down or disenabled.

At this point, the periodic management of the CPE at the client premise is complete and the CPE is once again ready for use in the DSL connection between the client premise and the target customer site.

The remote management process 400 may also include a remote connectivity testing process, such as the process 300 shown in and described with reference to FIG. 3. The remote connectivity testing process confirms connectivity between the CPE at the remote client premise and the PPP server at the NOC.

Figure 5:
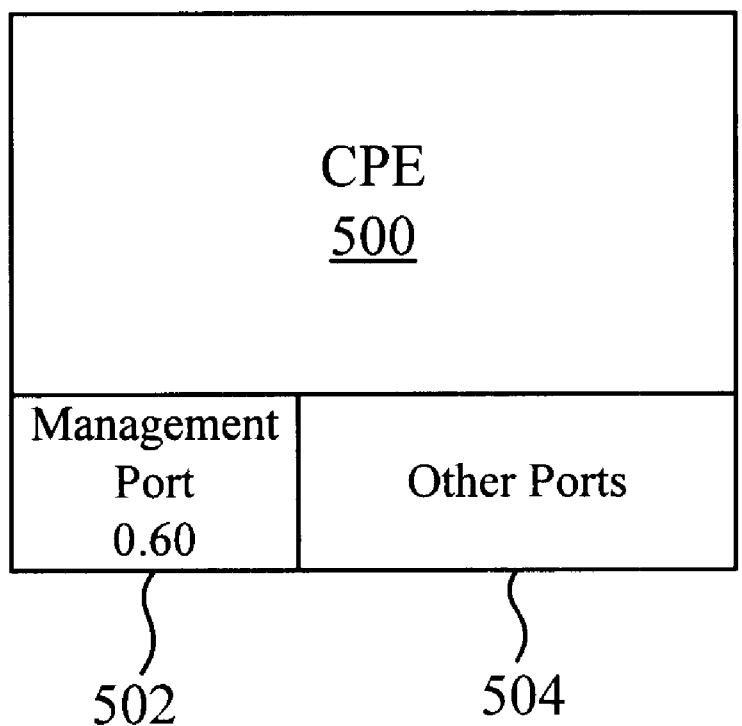
FIG. 5 is a schematic of a modified CPE adapted to be remotely configured and managed.

FIG. 5 is a schematic of a modified CPE 500 adapted to be remotely configured and managed. The CPE 500 at the remote client premise may be similar to a conventional DSL CPE but incorporating some modifications such that the CPE is adapted to be remotely configured and managed. In particular, the CPE may include a separate management port 502 reserved for configuration and management and other ports 504 conventionally provided in the CPE. The separate management port 502 utilizes PPP over ATM mode to continuously and automatically send requests to the PPP server.

For example, a conventional CPE may include a port having an address or 0.38 for data transfer and a port having an address of 0.39 for voice. The conventional CPE may be modified to include, for example, a port having an address of 0.60 and PPP over ATM mode. The 0.60 port is such that it continuously sends requests for connection using PPP over ATM.

The requests from the CPE to the PPP server is only responded by the PPP server when a PVC is established between the PPP server and the modified CPE. Once the PVC between the PPP server and the modified CPE is established, the PPP server awaits a request or data on the PVC from the CPE. As the separate management port of the CPE is automatically and continuously sending requests, the request in the form of a PPP packet is delivered from the modified CPE to the PPP server over ATM, i.e. layer 2, upon establishment of the PVC.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method for providing remote configuration of a client premise equipment, comprising the steps of:

creating a temporary management ATM virtual circuit between a remote Point-to-Point Protocol server and the client premise equipment via an ATM network;

assigning a temporary Internet Protocol address to the client premise equipment using Point-to-Point Protocol over ATM;

telneting from the Point-to-Point Protocol server to the temporary Internet Protocol address of the client premise equipment; and downloading client premise equipment configuration from the Point-to-Point Protocol server to the client premise equipment wherein the client premise equipment configuration includes a permanent client premise equipment Internet Protocol address different from the temporary Internet Protocol address.

2. The method for providing remote configuration of a client premise equipment of claim 1, wherein said temporary management ATM virtual circuit is selected from the group consisting of a permanent virtual circuit and a switch virtual circuit.

3. The method for providing remote configuration of a client premise equipment of claim 1, further comprising requesting the temporary Internet Protocol address from the Point-to-Point Protocol server by the client premise equipment prior to said assigning.

4. The method for providing remote configuration of a client premise equipment of claim 1, further comprising sending a reboot signal from the Point-to-Point Protocol server to the client premise equipment after said downloading.

5. The method for providing remote configuration of a client premise equipment of claim 1, further comprising disenabling the management ATM virtual circuit between a remote Point-to-Point Protocol server and the client premise equipment via the ATM network after said downloading.

6. The method for providing remote configuration of a client premise equipment of claim 1, wherein said downloading comprises downloading initial client premise equipment configuration software from the Point-to-Point Protocol server to the client premise equipment.

7. The method for providing remote configuration of a client premise equipment of claim 6, wherein said downloading initial client premise equipment configuration software includes downloading an assigned client premise equipment Internet Protocol address.

8. The method for providing remote configuration of a client premise equipment of claim 1, wherein said downloading client premise equipment configuration from the Point-to-Point Protocol server to the client premise equipment, said client premise equipment configuration is software selected from the group consisting of upgrade client premise equipment configuration software, troubleshooting client premise equipment software, client premise equipment configuration feature activation software, client premise equipment configuration feature deactivation software, and client premise equipment target change software.

9. The method for providing remote configuration of a client premise equipment of claim 1, further comprising verifying connectivity after said downloading.

10. The method for providing remote configuration of a client premise equipment of claim 9, wherein said verifying comprises pinging to the client premise equipment.

11. The method for providing remote configuration of a client premise equipment of claim 10, wherein said verifying comprises awaiting a response from the client premise equipment to said pinging.

12. The method for providing remote configuration of a client premise equipment of claim 11, wherein upon no response from the client premise equipment to said pinging after said awaiting for a predetermined period of time, further comprising repeating said creating, assigning, telneting, and downloading.

13. The method for providing remote configuration of a client premise equipment of claim 1, wherein said creating, assigning, telneting, and downloading are performed between the remote Point-to-Point Protocol server and a management port of the client premise equipment.

14. A system for providing remote configuration of a client premise equipment, comprising:
 a remote Point-to-Point Protocol server adapted to assign a temporary Internet Protocol address to the client premise equipment;
 a client premise equipment including a management port adapted to send requests for connection to the remote Point-to-Point Protocol server and to receive data downloaded from the remote Point-to-Point Protocol server, the client premise equipment being associated with a permanent client premise equipment Internet Protocol address different from the temporary Internet Protocol address; and
 a temporary management ATM virtual circuit between the remote Point-to-Point Protocol server and the management port of the client premise equipment.

15. The system for providing remote configuration of the client premise equipment of claim 14, wherein said temporary management ATM virtual circuit is selected from the group consisting of a permanent virtual circuit and a switch virtual circuit.

16. The system for providing remote configuration of the client premise equipment of claim 14, wherein said management port of the client premise equipment is configured to continuously and automatically send requests for connection to the Point-to-Point Protocol server.

17. The system for providing remote configuration of the client premise equipment of claim 14, wherein said management port of the client premise equipment has an address of 0.60

18. The system for providing remote configuration of the client premise equipment of claim 14, wherein said management port of the client premise equipment operates in Point-to-Point Protocol over ATM mode.

19. The system for providing remote configuration of the client premise equipment of claim 14, wherein the client premise equipment is configured to request for an Internet Protocol address from the Point-to-Point Protocol server.

20. The system for providing remote configuration of the client premise equipment of claim 14, wherein the remote Point-to-Point Protocol server is adapted to assign a temporary Internet Protocol address to establish connectivity between the remote Point-to-Point Protocol server and the client premise equipment.

21. The system for providing remote configuration of the client premise equipment of claim 14, wherein the remote Point-to-Point Protocol server is adapted to download a reboot signal to the client premise equipment and the client premise equipment is configured to reboot upon receiving the reboot signal.

22. The system for providing remote configuration of the client premise equipment of claim 14, wherein data downloaded from the remote Point-to-Point Protocol server to the client premise equipment is software selected from the group consisting of upgrade client premise equipment configuration software, troubleshooting client premise equipment software, client premise equipment configuration feature activation software, client premise equipment configuration feature deactivation software, and client premise equipment target change software.

* * * * *